United States Patent
Pannakal et al.

(10) Patent No.: US 12,527,736 B2
(45) Date of Patent: Jan. 20, 2026

(54) *PUNICA GRANATUM* EXTRACT AND ITS COSMETIC USES

(71) Applicant: L'OREAL, Paris (FR)

(72) Inventors: Steve Pannakal, Bengaluru (IN); Arun Duraisamy, Bengaluru (IN)

(73) Assignee: L'OREAL, Paris (FR)

( * ) Notice: Subject to any disclaimer, the term of this patent is extended or adjusted under 35 U.S.C. 154(b) by 639 days.

(21) Appl. No.: 17/763,396

(22) PCT Filed: Sep. 30, 2020

(86) PCT No.: PCT/EP2020/077391
§ 371 (c)(1),
(2) Date: Mar. 24, 2022

(87) PCT Pub. No.: WO2021/064034
PCT Pub. Date: Apr. 8, 2021

(65) Prior Publication Data
US 2022/0362139 A1 Nov. 17, 2022

(30) Foreign Application Priority Data
Oct. 1, 2019 (IN) ............................. 201921039821

(51) Int. Cl.
*A61K 8/49* (2006.01)
*A61K 8/60* (2006.01)
*A61K 8/9789* (2017.01)
*A61Q 17/04* (2006.01)
(Continued)

(52) U.S. Cl.
CPC ............ *A61K 8/9789* (2017.08); *A61K 8/498* (2013.01); *A61Q 19/00* (2013.01); *A61Q 19/08* (2013.01); *A61K 2800/522* (2013.01)

(58) Field of Classification Search
None
See application file for complete search history.

(56) References Cited

U.S. PATENT DOCUMENTS 8,263,140 B1   9/2012   Dreher et al.
8,758,832 B1   6/2014   Anderson et al.

FOREIGN PATENT DOCUMENTS

EP   1 967 078 A1   9/2008
FR   3 031 901 A1   7/2016

OTHER PUBLICATIONS

FR3031901A1—Google English Translation (Year: 2016).*
(Continued)

*Primary Examiner* — Kyung S Chang
(74) *Attorney, Agent, or Firm* — POLSINELLI PC (57) ABSTRACT

Provided are an extract of *Punica granatum* comprising at least 10% by weight of the total weight of the dry extract, of punicalagins, and at least 10% by weight of the total weight of the dry extract of ellagic acid; wherein the weight ratio of the ellagic acid to the punicalagins ranges from 0.5 to 2; and a method of preparation of the extract. Also, provided is a preparation comprising the extract and at least one water-miscible organic solvents preferably chosen from lower alcohols containing from 2 to 8 carbon atoms and especially from 2 to 6 atoms. Moreover, provided are a composition comprising the extract or preparation; a process for the cosmetic treatment of keratin materials, comprising a step of applying the composition and cosmetic uses of the extract.

17 Claims, 2 Drawing Sheets

(51) Int. Cl.
A61Q 19/00 (2006.01)
A61Q 19/08 (2006.01)

(56) References Cited

OTHER PUBLICATIONS

FR3031901A1—Google English Translation (pp. 1-10) (Year: 2016).*
Do et al., "Effect of extraction solvent on total phenol content, total flavonoid content," Journal of Food and Drug Analysis, vol. 22, issue 3, Sep. 2014, pp. 296-302 (Year: 2014).*
Sun et al., "In vitro and in vivo antioxidant activities of three major polyphenolic compounds in pomegranate peel: Ellagic acid, punicalin, and punicalagin", Journal of Integrative Agriculture, 2017, 16(8):1808-1818. (Year: 2017).*

* cited by examiner

PUNICA GRANATUM EXTRACT AND ITS COSMETIC USES

CROSS REFERENCE TO RELATED APPLICATIONS

This application is a National Phase filing under 35 U.S.C. § 371 of PCT/EP2020/077391 filed on 30 Sep. 2020; which application in turn claims priority to application No. 201921039821 filed in India on 1 Oct. 2019. The entire contents of each application are hereby incorporated by reference.

The present invention concerns the cosmetic field, and especially an extract of *Punica granatum*, and its method of preparation, the composition comprising the said extract and its cosmetic uses as an antioxidant or antiradical agent.

Antioxidants are used in cosmetics for combating the free radicals ($O^-_2$, $HO°$, etc.) that result in chain reactions that may damage keratin materials, inter alia, and more generally that induce cell ageing.

The role of antioxidants is thus to capture the free radicals and convert them to substances that are harmless to the keratin materials of human beings. Indeed, antioxidants neutralize the reactive oxygen species which are continually generated by the metabolism. These reactive oxygen species (ROSs) disrupt biological mechanisms (especially at the protein or lipid level) and induce an oxidizing stress. This in turn contributes to the development and acceleration of tissue ageing, via in particular the appearance of wrinkles.

Among the exogenous factors capable of promoting the formation of reactive oxygen species, mention may be made of solar rays.

Antioxidants may therefore be used in various cosmetic areas such as anti-ageing, protection against oxidative stresses and especially exogenous stresses due to sun exposition, or else anti-pigmentation (the synthesis of melanin being an oxidative process).

The production of reactive oxygen species therefore causes damage to proteins or lipids, contributing in particular to accelerating cell ageing of the keratin materials, especially skin and/or annexes.

In particular, the effects of oxidative stress adversely affect cell respiration and especially result in an accelerated ageing of the skin, with in particular a dull and/or grey complexion, an uneven complexion, a loss of radiance and/or transparency of the skin, the premature formation of wrinkles or fine lines, a loss of softness, suppleness and elasticity of the skin, the appearance of pigment spots, in particular of actinic lentigo.

The effects of oxidative stress are also manifested by a reduction in the vigour of the hair and/or a deterioration in the appearance thereof, in particular a dull appearance.

Many antioxidants exist already, such as tocopherol (vitamin E) or derivatives thereof, vitamin C or derivatives thereof, carotenoids, ubiquinone, green tea, etc.

*Punica granatum* extracts are also known from the prior art as an antioxidant active agent, especially FR3031901 describes a *Punica granatum* extract obtained with a mixture of 70% w/w ethanol/30% w/w water, comprising no more than 1.93% of ellagic acid, with a weight ratio [ellagic acid/punicalagins A and B] equal to 0.2, such extract being.

However, there is a need for alternative antioxidants which are more effective than those of the prior art, that make it possible in particular to protect the keratin materials of human beings (the skin and/or its annexes) from the harmful or unattractive effects of oxidative stress.

The Applicant has surprisingly demonstrated that a *Punica granatum* extract comprising at least 10% by weight of the total weight of the dry extract, of punicalagins; and at least 10% by weight of the total weight of the dry extract, of ellagic acid; wherein the weight ratio [ellagic acid/punicalagins] is ranging from 0.5 to 2 has good antioxidant properties, and especially free-radical scavenging properties by protecting lipid of the skin against UVA lipid peroxidation.

Moreover, the extract according to the invention is useful for preventing and/or treating the signs of skin aging.

In addition, the extract according to the invention is useful for preventing and/or reducing the dull and/or heterogeneous appearance of complexion.

Other advantages of the extract or the preparation as mentioned below according to the invention are good stability properties especially at 40° C. during two months and/or an easy solubilization of the extract in particular at 25° C. in cosmetic compositions.

One subject of the present invention is therefore an extract of *Punica granatum* comprising:
  i. at least 10% by weight of the total weight of the dry extract, of punicalagins; and
  ii. at least 10% by weight of the total weight of the dry extract, of ellagic acid; and
  wherein the weight ratio [ellagic acid/punicalagins] is ranging from 0.5 to 2.

Another subject of the invention is a method of preparation of the *Punica granatum* extract according to the invention comprising at least the following steps of:
  i. providing a *Punica granatum* pericarp;
  ii. extracting from the said pericarp, at least punicalagins and ellagic acid, with ethanol of at least 99.5% degree at a temperature ranging from 37° C. to 45° C. during 2 to 5 hours;
  iii. filtering and repeating the step ii. at least two more times; and
  iv. optionally drying the filtrate obtained at the end of the step iii. at a temperature ranging from 35° C. to 40° C. under vacuum.

Another subject of the invention is a preparation comprising the extract according to the invention and at least one water-miscible organic solvent preferably chosen from lower alcohols containing from 2 to 8 carbon atoms and in particular from 2 to 6 atoms.

The present invention also concerns a composition, in particular cosmetic composition, comprising the extract or the preparation according to the invention in a physiologically acceptable medium.

Another subject of the invention is a process for the cosmetic treatment of keratin materials, in particular the skin, comprising a step of applying a composition comprising the extract of *Punica granatum* according to the invention or the preparation according to the invention onto the keratin materials, in particular the skin.

The invention also relates to the cosmetic use of the extract according to the invention, in a composition containing a physiologically acceptable medium:
  as an antioxidant or antiradical agent;
  as an agent for preventing and/or treating the signs of skin aging;
  to prevent and/or reduce the dull and/or heterogeneous appearance of complexion.

Definitions

The term "keratin materials" means skin, hair, eyelashes, and nails.

The term "skin" refers to the entire body skin, including the scalp, mucous membranes and semi-mucous membranes, and its annexes. Specifically, it is considered in the present invention the skin of the chest, neck and face, hands, armpits and especially facial skin.

The term "annexes" is understood to mean head hair, body hair, eyelashes, nails and preferably head hair.

As used herein, the term "treating" or "treatment" refers to any action that aims to improve the comfort or the well-being of an individual. This term therefore covers attenuating, relieving or suppressing the symptoms of aged skin, but is limited to a cosmetic treatment.

For the purposes of the present invention, the term "preventing" means reducing the risk if manifestation of a phenomenon.

The term "antioxidant" means a compound that decreases or prevents oxidation of other chemical compounds. Oxidation is a part of a redox reaction that transfers electrons from a substance to an oxidizing agent. This reaction can produce free radicals. An antioxidant agent may in particular be an antiradical agent.

A "free radical" is a chemical species with one or more electrons unmatched on its outer layer as for example oxygen free radicals. The oxygen free radicals are in particular:
 a. the singlet oxygen ·O—O·;
 b. the superoxide radical anion $O_2\cdot^-$;
 c. the hydroxyl radical HO·;
 d. the hydroperoxyl radical $HO_2\cdot$;
 e. the peroxide radical (ROO·) and the alcoxy radical (RO·) where R is a carbon based chain.

"Antiradical" means a compound that neutralizes the free radicals formed.

The terms "oxidative stress" as used in the present application covers all of the damage caused by an increase in oxygen free radicals in a subject.

For the purposes of the invention the term "punicalagins" means a mixture of two diastereoisomeres, punicalagin A and B. They belongs to the polyphenols family, and especially are complex ellagitannins formed of glucose linked to ellagic acid and gallagic acid of molar mass about 1084 gmol-1 formed by the isomers of 2,3-(S)-hexahydroxydiphenoyl-4,6-(S,S)-gallagyl-D-glucose of chemical formula (I).

For the purposes of the invention the term "ellagic acid" means a polyphenol of formula (II).

The term "punicalins" means a mixture of two diastereoisomeres, punicalin A and B. They belongs to the polyphenols family, and especially are ellagitannins named 4,6-(S, S)-Gallagyl-D-glucose of chemical formula (III).

*Punica granatum* is a fruit-bearing deciduous shrub or small tree in the family Lythraceae that grows between five and 10 m (16-30 feet) tall. On multiple, spiny branches, the deciduous leaves are opposite or in whorls of five or six, short-stemmed, oblong-lanceolate, leathery, and 1-10 cm (0.4-4 in) long. Showy red, white, or variegated flowers are found on the branch tips, singly or in clusters of up to five flowers. Nearly round, but crowned at the base by the prominent calyx, the pomegranate fruit has a tough, leathery skin or rind, and is basically yellow overlaid with light or deep pink or rich red. The interior is separated by membranous walls and white spongy tissue into compartments packed with transparent sacs filled with tart, flavorful, fleshy, juicy pulp (the aril). In each sac, there is one white or red, angular, soft or hard seed. The arils represent about 52% of the weight of the whole fruit.

For the purposes of the present invention, the fruit and in particular the pericarp of *Punica granatum* is more preferred.

In a preferred embodiment of the present invention, the fruit of *Punica granatum* is collected from the India state of Jammu and Kashmir around the Ramban district (kanga village) during the period of September to December, more particularly at the latitude and longitude around 32° N, 74° E.

DETAILED DESCRIPTION OF THE INVENTION

Punica granatum Extract

Preferably, the extract according to the invention comprises:
i. from 10% to 15% by weight of the total weight of the dry extract, of punicalagins, preferably from 10.5% to 15%, more preferably from 10.8% to 14.8%, even more preferably from 11.7% to 14.6%; and
ii. from 10% to 15% by weight of the total weight of the dry extract of ellagic acid, preferably from 10.5% to 14.5%, more preferably from 10.8% to 14.8%, even more preferably from 11.2% to 14.5%.

The extract according to the invention can further comprise 1% to 5% by weight of the total weight of the dry extract, of punicalins, preferably 2% to 4.5%, even more preferably 3% to 4%.

Advantageously, the weight ratio [ellagic acid/punicalagins] is ranging from 0.6 to 1.6, more preferably from 0.7 to 1.3, even more preferably from 0.7 to 1.

In a first preferred embodiment, the extract according to the invention comprises:
i. from 11.7% to 14.6% by weight of the total weight of the dry extract, of punicalagins, and
ii. from 11.2% to 14.5% by weight of the total weight of the dry extract of ellagic acid,
and wherein the weight ratio [ellagic acid/punicalagins] is ranging from 0.6 to 1.6, more preferably from 0.7 to 1.3, even more preferably from 0.7 to 1.

In a second preferred embodiment, the extract according to the invention comprises
i. from 11.7% to 14.6% by weight of the total weight of the dry extract, of punicalagins, and
ii. from 11.2% to 14.5% by weight of the total weight of the dry extract of ellagic acid, and
iii. from 3% to 4% by weight of the total weight of the dry extract, of punicalins,
and wherein the weight ratio [ellagic acid/punicalagins] is ranging from 0.6 to 1.6, more preferably from 0.7 to 1.3, even more preferably from 0.7 to 1.

The Punica granatum extract according to the invention is either as form as an ethanolic extract or as a dry extract.

The terms "dry extract" means an extract which comprises no more than 7% by weight of solvents relative to the total weight of the dry extract, preferably no more than 5%, more preferably no more than 3% by weight of solvents relative to the total weight of the dry extract. In preferred embodiment, the dry extract comprises no more than 1% by weight of solvents relative to the total weight of the dry extract. In another preferred embodiment, the dry extract does not contain any solvent (i.e. 0%).

The term "solvent" means aqueous, organic solvents and their mixtures.

As aqueous solvents, a mention may be made of water.

As organic solvents, a mention may be made of alcoholic solvent, especially monoalcohol in $C_2$-$C_5$ as those chosen from ethanol, propanol, isopropanol, butanol and pentanol, and their mixtures.

Method of Preparation of the Punica granatum Extract

Another object of the present invention is the method of preparation of the extract of the Punica granatum extract according to the invention comprises at least the following steps of:

i. providing a Punica granatum pericarp;
ii. extracting from the said pericarp, at least punicalagins and ellagic acid, with ethanol of at least 99.5% degree at a temperature ranging from 37° C. to 45° C. during 2 to 5 hours;
iii. filtering and repeating the step ii. at least two more times;
iv. optionally drying the filtrate obtained at the end of the step iii. at a temperature ranging from 35° C. to 40° C. under vacuum.

Advantageously, ethanol in step ii. has a moisture level less than 0.5%, more preferably less than 0.2%.

Preferably, the Punica granatum pericarp provided at step i. is a dried pericarp as form as a powder which especially comprises from 1% to 5% by weight of the total weight of the dried pericarp powder of punicalagins and from 1% to 5% by weight of the total weight of the dried pericarp powder of ellagic acid, more preferably from 2% to 3% by weight of the total weight of the dried pericarp powder of punicalagins and from 1% to 4% by weight of the total weight of the dried pericarp powder of ellagic acid.

In a preferred embodiment, the weight ratio [pericarp/absolute ethanol] is 1:5.

Advantageously, the temperature of the extracting step ii. is ranging from 40° C. to 43° C., more preferably is 42° C.

The step iii. of filtering is made according to conventional method of filtration well known by the skilled person of the art, for example by a Buchner funnel.

Preferably, the temperature of the drying step iv. is ranging from 37° C. to 39° C., more preferably is 38° C.

In a particular embodiment, the method of preparation of the extract of the Punica granatum extract according to the invention consists in the following steps of:
v. providing a Punica granatum pericarp;
vi. extracting from the said pericarp, at least punicalagins and ellagic acid, with ethanol of at least 99.5% degree at a temperature ranging from 37° C. to 45° C. during 2 to 5 hours;
vii. filtering and repeating the step ii. at least two more times;
viii. optionally drying the filtrate obtained at the end of the step iii. at a temperature ranging from 35° C. to 40° C. under vacuum.

Preparation

The present invention also concerns a preparation comprising the extract according to the invention and at least one water-miscible organic solvent preferably chosen from lower alcohols containing from 2 to 8 carbon atoms and in particular from 2 to 6 atoms.

More preferably the said solvent is chosen from glycerin, ethanol, butylene glycol, dipropylene glycol, ethoxydiglycol, and their mixtures, even more preferably chosen from butylene glycol, dipropylene glycol, ethoxydiglycol, and their mixtures.

In a more preferred embodiment, the said solvent is chosen from butylene glycol, dipropylene glycol, and their mixtures.

Advantageously, the weight ratio [solvent(s)/dry extract] ranges from 95:5 to 99.9999:0.0001, preferably from 96:4 to 99.999:0.001, more preferably from 97:3 to 99.99:0.01.

The said extract may represent from 0.0001% to 5% by weight in dry extract of the total weight of the preparation and the said at least one solvent may represent from 95% to 99.9999% by weight of the total weight of the preparation, preferably the said extract may represent from 0.001% to 4% by weight in dry extract of the total weight of the preparation and the said at least one solvent may represent from 96% to 99.999% by weight of the total weight of the preparation, more preferably the said extract may represent from 0.01% to 3% by weight in dry extract of the total weight of the preparation and the said at least one solvent may represent from 97% to 99.99% by weight of the total weight of the preparation.

Composition

The present invention also concerns a composition, in particular cosmetic composition, comprising the extract or the preparation according to the invention in a physiologically acceptable medium.

The extract according to the invention may be present in the said composition from 0.0001% to 5% by weight in dry extract of the total weight of the composition, preferably from 0.001% to 4% by weight in dry extract, more preferably from 0.01% to 3% by weight in dry extract, even more preferably from 0.5% to 2.5% by weight in dry extract of the total weight of the composition.

The preparation according to the invention may be present in the said composition from 0.1% to 60% by weight of the total weight of the composition, preferably from 0.5% to 50% by weight, more preferably from 1% to 40% by weight of the total weight of the composition.

The said composition may be a cosmetic composition comprising a physiologically acceptable medium, especially a medium compatible with the skin and the scalp.

According to a particular embodiment, the pH of the cosmetic composition is between 4 and 7.5, especially between 4.5 and 7, and in particular between 4.7 and 6.5.

The physiologically acceptable medium of the composition may more particularly comprise water and optionally a physiologically acceptable water-soluble organic solvent chosen, for example, from lower alcohols containing from 2 to 8 carbon atoms and in particular from 2 to 6 atoms. carbon, such as ethanol, isopropanol, propanol, butanol; polyethylene glycols having from 6 to 80 ethylene oxide units and polyols such as propylene glycol, isoprene glycol, butylene glycol, glycerine and sorbitol.

The said water-soluble organic solvent may represent from 0.5% to 25% by weight of the total weight of the composition, preferably from 1% to 20% by weight of the total weight of the composition, more preferably from 1.5% to 15% by weight of the total weight of the composition.

In a preferred embodiment, the composition comprises the preparation as defined above and a physiologically acceptable medium which may more particularly comprise water and optionally an additional physiologically acceptable water-soluble organic solvent. In such embodiment, said additional water-soluble organic solvent may represent from 0.5% to 25% by weight of the total weight of the composition, preferably from 1% to 20% by weight of the total weight of the composition, more preferably from 1.5% to 15% by weight of the total weight of the composition.

Galenic Forms

In a preferred embodiment, the composition according to the invention is administered topically.

The support may be of diverse nature depending on the type of composition under consideration.

As more particularly regards the compositions intended for external topical administration, they may be aqueous, aqueous-alcoholic or oily solutions, solutions or dispersions of the lotion or serum type, emulsions of liquid or semi-liquid consistency of the milk type, obtained by dispersing a fatty phase in an aqueous phase (O/W) or conversely (W/O), or suspensions or emulsions, of soft, semi-solid or solid consistency, of the cream type, aqueous or anhydrous gels, microemulsions, microcapsules, microparticles, or vesicular dispersions of ionic and/or nonionic type.

These compositions are prepared according to the usual methods.

When a composition of the invention is an emulsion, the proportion of the fatty phase may range from 5% to 80% by weight and preferably from 10% to 50% by weight relative to the total weight of the composition. The oils, emulsifiers and co-emulsifiers used in the composition in emulsion form are chosen from those conventionally used in the cosmetics and/or dermatology field. The emulsifier and the co-emulsifier may be present in the composition in a proportion ranging from 0.3% to 30% by weight and preferably from 0.5% to 20% by weight relative to the total weight of the composition.

When the composition of the invention is an oily solution or gel, the fatty phase may represent more than 90% of the total weight of the composition.

The composition used according to the invention may constitute a skincare composition, and in particular a cleansing, protecting, treating or care cream for the face, the hands, the feet, the major anatomical folds or the body (for example day creams, night creams, makeup-removing creams, foundation creams or anti-sun creams); a fluid foundation, a makeup-removing milk, a protective or care body milk or an anti-sun milk; a skincare lotion, gel or mousse, such as a cleansing lotion.

Adjuvants

In a known manner, the galenical forms intended for topical administration may also contain adjuvants that are customary in the cosmetics, pharmaceutical and/or dermatology field, such as hydrophilic or lipophilic gelling agents, hydrophilic or lipophilic active agents, emulsifiers, preserving agents, additional antioxidants different of the compounds of the invention, solvents, fragrances, fillers, UV screening agents, odour absorbers and colorants. The amounts of these various adjuvants are those conventionally used in the field under consideration, for example from 0.01% to 20% of the total weight of the composition. Depending on their nature, these adjuvants may be introduced into the fatty phase and/or into the aqueous phase.

The composition can also contain oils such as mineral oils, for instance hydrogenated polyisobutene and liquid petroleum jelly; plant oils, for instance a liquid fraction of shea butter, sunflower oil and apricot kernel oil; animal oils, for instance perhydrosqualene, synthetic oils, in particular purcellin oil, isopropyl myristate and ethylhexyl palmitate; fluoro oils, for instance perfluoropolyethers. The composition can also contain unsaturated fatty acids or fatty alcohols; waxes; silicone compounds, for instance silicone oils; resins; gums.

As indicated previously, the composition according to the invention may also contain UV screening agents or photoprotective agents that are active in UVA and/or UVB light, in the form of organic or inorganic compounds, the latter optionally being coated in order to render them hydrophobic.

In a preferred embodiment, the composition according to the invention further comprises at least one ingredient selected from silicone fats such as oils, gums and silicone waxes; non-silicone fatty substances such as oils, pastes and waxes of vegetable, mineral, animal and/or synthetic origin; fatty acids having 8 to 32 carbon atoms; esters and synthetic ethers, in particular of formula R1COOR2 and R1OR2 in which R1 represents the residue of a fatty acid containing from 8 to 29 carbon atoms, and R2 represents a hydrocarbon chain, branched or unbranched, containing from 3 to 30 carbon atoms. carbon atoms; linear or branched hydrocarbons of mineral or synthetic origin; fatty alcohols having from 8 to 26 carbon atoms; some water; C2-C6 alcohols; glycols such as propylene glycol, ketones; thickeners, emulsifiers, surfactants, gelling agents, cosmetic active ingredients, perfumes, fillers, dyestuffs, moisturizers, vitamins, polymers.

Cosmetic Processes

Another subject of the invention is a process for the cosmetic treatment of keratin materials, in particular the skin, comprising a step of applying a composition comprising an extract of *Punica granatum* or a preparation as defined previously onto the keratin materials, in particular the skin.

In particular, the treatment method aims to prevent and/or reduce the effects of oxidative stress or free radicals, in particular from the effects of UV radiation, on the keratin materials, in particular the skin.

It also relates to a method for the cosmetic treatment of the skin intended to prevent and/or treat the signs of skin ageing, in particular induced by an oxidative stress.

Among the signs of skin ageing especially induced by an oxidative stress, mention is especially made of a loss of firmness and/or elasticity and/or tone and/or suppleness of the skin, the formation of wrinkles and fine lines, expression lines, in particular on the forehead and in the space between the eyebrows, perioral wrinkles and fine lines, and/or slackening in the area around the lips, in particular in the top lip area (area between the top lip and the nose), a dull appearance of the complexion, and the papery appearance of the skin.

It also aims to prevent skin pigmentation, in particular induced by an oxidative stress, especially by UV radiation. comprising at least one step that consists in applying to skin exhibiting signs of skin ageing a composition comprising an extract of *Punica granatum* as defined previously.

In particular, the method according to the invention aims to prevent and/or reduce the pigment spots of the skin, in particular actinic lentigo; to lighten the skin; to prevent the dull complexion and/or grey complexion, and/or to improve the brightness and/or the evenness of the complexion; to improve the radiance and/or transparency of the skin; to improve the softness, suppleness and/or elasticity of the skin; and/or to prevent and/or reduce wrinkles and/or fine lines.

Cosmetic Uses

The present invention concerns also the cosmetic use of the *Punica granatum* extract according to the invention, especially in a composition containing a physiologically acceptable medium, as an antioxidant or antiradical agent, in particular the said extract is intended to prevent and/or reduce the effects of oxidative stress or free radicals on the keratin materials, in particular the skin.

It also relates to the cosmetic use of the *Punica granatum* extract according to the invention, especially in a composition containing a physiologically acceptable medium, as an anti-aging agent, especially as an agent for preventing and/or treating the signs of skin aging.

It also concerns the cosmetic use of the *Punica granatum* extract according to the invention, especially in a composition containing a physiologically acceptable medium, to prevent and/or reduce the dull and/or heterogeneous appearance of complexion.

In the whole description, the expression «comprising a» or «containing a» means «comprising at least one» or «containing at least one», unless otherwise specified.

In the description, the expression "at least one" means "one or more".

In the description and in the following examples, unless stated otherwise, the percentages are percentages by weight and the ranges of values written as "between . . . and . . . " or "from . . . to . . . " include the upper and lower limits specified. The ingredients are mixed, before their shaping, in order and under conditions easily determined by the skilled person.

We will now give concrete examples illustrating the invention, but that are in no way restrictive.

All percentages given in the examples are given by mass, unless specified otherwise, and the temperature is ambient (20° C.) and expressed in degrees Celsius unless specified otherwise, and the pressure is atmospheric pressure, unless specified otherwise.

EXAMPLES

Figure 1:
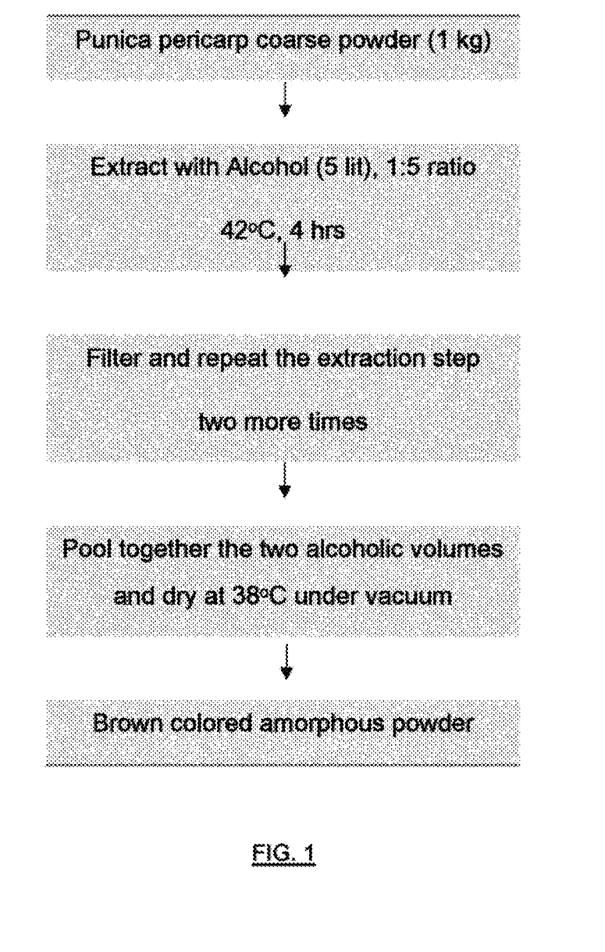
FIG. 1: Schema of the method of preparation of a *Punica granatum* extract according to the invention.

Example 1: Preparation of the *Punica granatum* Extract According to the Invention Dried pericarp of *Punica granatum* (1 kg) was extracted at 42° C. with 5 Litres of Ethanol (Proof 99.5%) with stirring at 800 rpm for a brief period of 4 h. The ethanolic extract obtained was filtered through a Buchner funnel containing cotton cloth (mesh size: 20 micron). The filtered extract was evaporated under vacuum at 38° C., to afford a brown amorphous powder. The extraction is repeated successively for two consecutive times under the conditions explained above. The combined dried extract consists of the major phenolic compounds ie: Ellagic acid and punicalagins. The schema of the preparation method of a *Punica granatum* extract according to the invention is presented in FIG. 1.

The specifications of the extract according to the invention are as follows:

TABLE 1

Specifications of the extract

| Parameters | Values in % w/w |
| --- | --- |
| Punicalagins | 14.44% |
| Punicalins | 3.28% |
| Total polyphenols (punicalins, punicalagins and ellagic acid, gallic acid, epi-catechin gallate, gallagic acid, ellagic acid hexoside/glycoside) | 42% |

TABLE 1-continued

Specifications of the extract

| Parameters | Values in % w/w |
|---|---|
| Total fats | 2.6% |
| Total protein | 0.73% |
| Total sugars | 19.1% |
| Moisture | 6.5% |

The ratio of these two compounds namely Ellagic acid and punicalagins vary with different organic extraction solvent used ie: Absolute alcohol: 99.5% and rectified spirit: 95.0-96.0%, Methanol, ethyl acetate and aqueous acetone. Therefore, the extraction was performed with different organic solvents. The results indicate that the absolute alcohol (proof: 99.5%) provides an extract with the appropriate quantities and ratio of Ellagic acid/punicalagins.

TABLE 2

*Comparison of different organic solvents

| Impact of extraction solvents | Ellagic acid w/w % | Punicalagins w/w % | weight ratio [Ellagic acid/ Punicalagins] |
|---|---|---|---|
| Ethanol; Rectified spirit (polarity index 5.1; Proof: 95.0-96.0%) OUTSIDE OF THE INVENTION | 6% | 22% | 0.27 |
| Ethanol; Absolute Alcohol (polarity index 4.4; Proof: 99.5%) ACCORDING TO THE INVENTION | 11.35% | 14.44% | 0.79 |
| Methanol (Polarity Index 5.1) OUTSIDE OF THE INVENTION | 7.5-8.0% | 20.2% | 0.40 |
| Ethyl acetate (Polarity Index 4.7) OUTSIDE OF THE INVENTION | 4.81% | — | 0 |
| 70% Aqueous Acetone OUTSIDE OF THE INVENTION | — | 22.0% | — |

Furthermore, the ratio of these two compounds namely Ellagic acid and punicalagins vary in function of the temperature of the extracting step and of the temperature of the drying step. Therefore, the extracting step and drying step was performed at different temperatures (° C.).

TABLE 3

Comparison of different extraction temperatures

| Impact of extraction temperature | Ellagic acid w/w % | Punicalagins w/w % | Weight ratio [Ellagic acid/ Punicalagins] |
|---|---|---|---|
| 35° C. OUTSIDE OF THE INVENTION | 3.51% | 10.42% | 0.34 |
| 42° C. ACCORDING TO THE INVENTION | 11.35% | 14.44% | 0.79 |
| 50° C. OUTSIDE OF THE INVENTION | 16.45% | 2.65%% | 6.2 |
| 70° C. OUTSIDE OF THE INVENTION | 35.5% | 0.71% | 50 |

TABLE 4

Comparison of different drying temperatures

| Impact of Drying Temperature (Under Vaccum) | Ellagic acid w/w % | Punicalagins w/w % | weight ratio [Ellagic acid/ Punicalagins] |
|---|---|---|---|
| 38° C. ACCORDING TO THE INVENTION | 11.35% | 14.44% | 0.79 |
| 45° C. OUTSIDE OF THE INVENTION | 8.52% | 3.85% | 2.21 |

Example 2: Antioxidant Activity of the Extract According to the Invention Obtained in Example 1 a. Peroxidation of Lipids Test

An evaluation of the protection potential against UVA-induced lipid peroxidation of *Punica granatum* extract according to the invention obtained according to Example 1 was made and compared to the protection against UVA-induced lipid peroxidation of pure ellagic acid.

Normal human fibroblasts are treated either with the *Punica granatum* extract according to the invention at 0.001% or with pure ellagic acid at 3 μM for 24 h and then exposed to a UVA dose inducing no more than 20% cell death.

A control was performed consisting in normal human fibroblasts exposed to a UVA dose inducing no more than 20% cell death.

8-iso-Prostanes release is assayed 2 h30 after the exposure. The results are presented in FIG. 2.

Figure 2:
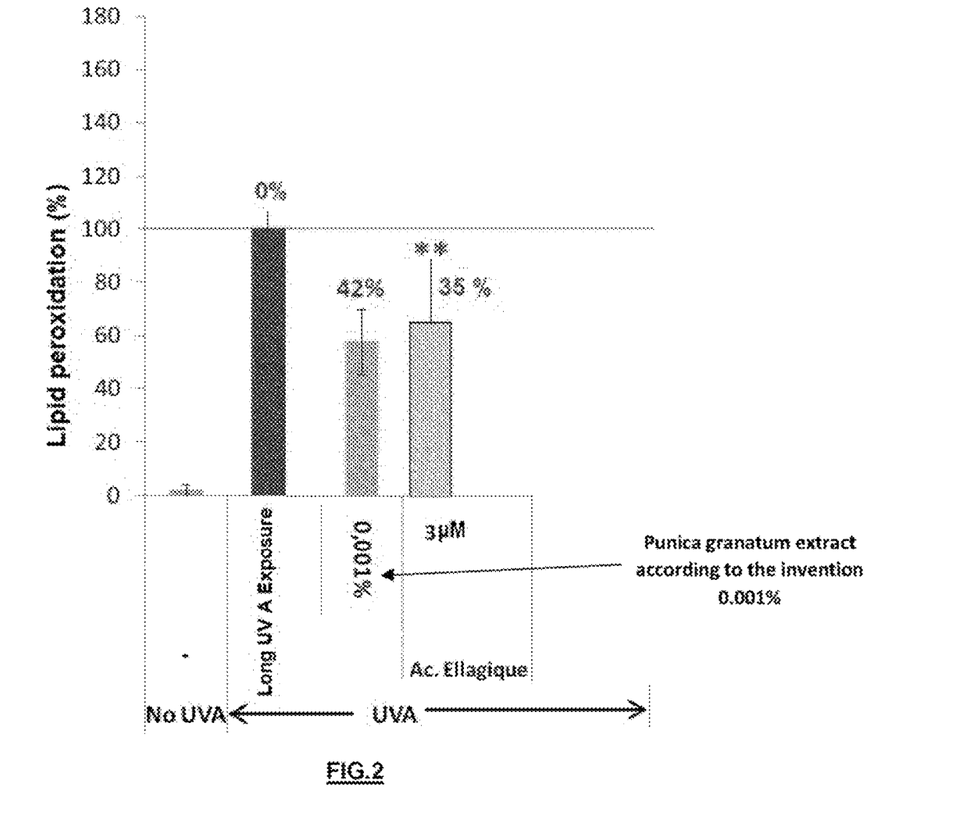
FIG. 2: Decrease of the lipid peroxidation with a *Punica granatum* extract according to the invention compared to Ellagic acid alone. Note: The value in % illustrated over each bar (in the graph) is the % protection offered by the raw materials tested vs long UV A exposure.

The control (UV exposed) shows a release of 100% of 8-iso-Prostanes, with 0% of protection against lipid peroxidation while the treatment with the *Punica granatum* extract according to the invention shows a lower release of 58% of 8-iso-Prostanes, with a higher protection against lipid peroxidation of 42%

Ellagic acid shows a release of 65% of 8-iso-Prostanes, with 35% of protection against lipid peroxidation.

Therefore, the *Punica granatum* extract according to the invention shows a better protection against lipid peroxidation than ellagic acid alone.

Example 3: Evaluation of the Antioxidant Activity of the Extract According to the Invention (Extraction Made with Ethanol 99.5%) Compared to the Extract Outside of the Invention (Extraction Made with Ethanol 95%)

The technique for evaluating the antioxidant activity of the compounds used according to the invention is carried out in accordance with a well-known method (J. of Photochemistry and Photobiology B: Biology 57 (2000) 102-112 TOBI et al.: Glutathione modulates the level of free radicals produced in UVA-irradiated cells). This technique uses a fluorescent probe, a marker of the intracellular overall oxidative stress, 2'-7'-dichlorofluorescin diacetate (DCFH-DA).

Principle

The use of DCFH-DA as a marker of the oxidative stress is based on its physicochemical properties. It is an apolar and nonionic molecule capable of diffusing through cell membranes. Once inside the cell, DCFH-DA will be hydrolysed by intracellular esterases to give a non-fluorescent compound: DCFH or 2,7-dichlorofluorescin. In the presence of activated oxygen species, DCFH is rapidly oxidized to give a highly fluorescent compound: DCF or 2,7-dichlorofluorescein.

Procedure:

Treatment of the Keratinocytes with an Extract According to the Invention Obtained in Example 1 (Extraction Made with Ethanol 99.5%) and an Extract Outside of the Invention Obtained in Example 1 (Extraction Made with Ethanol 95%)

At confluence, the keratinocytes are incubated in the presence of the extracts to be tested for 24 hours at 37° C., 5% $CO_2$, in the culture medium.

Incorporation of DCFH-DA

The keratinocytes, pretreated with the each of the extracts, are rinsed then incubated in the presence of DCFH-DA in the dark.

Exposure to UVA

After this incubation, the DCFH-DA solution is removed, the cells are then exposed to 2 $J/cm^2$ of UVA. Observation: an unexposed control plate is stored in the dark at room temperature.

Measurement of the Fluorescence

The fluorescence of DCF is evaluated immediately after the exposure to UVA, by spectrofluorimetry (excitation: 480 nm; emission: 530 nm).

Results

The photoprotective efficacy results are expressed in Table 4 below, as % decrease in fluorescence relative to the control cells exposed to UV A. The measurement is carried out on two samples and the average value is determined.

TABLE 5 results

| Extracts tested | Mean (% of fluorescence inhibition) |
|---|---|
| Extract according to the invention obtained in Example 1 (extraction made with ethanol 99.5%) Concentration: 0.0500 g/L | % Inhibition: 52% (n = 2) Active |
| Extract outside of the invention obtained in Example 1 (extraction made with ethanol 95%) Concentration: 0.100 g/L | % Inhibition: 13.1% (n = 2) Not Active |

The above results reveal a better antioxidant activity of the extract from Example 1 obtained with ethanol 99.5% with respect to the UVA-induced oxidative stress, with a higher fluorescence inhibition of DCF than those obtained with the extract from Example 1 extracted with ethanol 95%.

Thus, the *Punica granatum* extract according to the invention induce a better active photoprotection of the skin with respect to the untreated control and the comparative extract outside of the invention.

Example 4: Cosmetic Composition Comprising the Extract According to the Invention Obtained in Example 1

An anti-ageing aqueous gel for the skin is prepared, comprising (% by weight):

| | |
|---|---|
| Carbopol | 4% |
| Extract of *Punica granatum* obtained according to Example 1 | 0.5% |
| Water | qs. 100% |

After application to the face, the composition makes it possible to protect the skin from UVA-induced stress.

The invention claimed is:

1. An extract of *Punica granatum* comprising:
   i. from 10% to 15% by weight of the total weight of the dry extract, of punicalagins; and
   ii. from 10% to 15% by weight of the total weight of the dry extract, of ellagic acid; and
   wherein the weight ratio of the ellagic acid to the punicalagins is from 0.5 to 2; and wherein the extract is obtained by by a method comprising at least the following steps:
   a. providing a *Punica granatum* pericarp;
   b. extracting from the said pericarp, at least punicalagins and ellagic acid, with ethanol of at least 99.5% degree at a temperature ranging from 37° C. to 45° C. during 2 to 5 hours;
   c. filtering and repeating the step b. at least two more times, and
   d. optionally drying the filtrate obtained at the end of the step c. at a temperature ranging from 35° C. to 40° C. under vacuum.

2. The extract, according to claim 1, which comprises:
   i. from 10.8% to 14.8% by weight of the total weight of the dry extract, of the punicalagins; and
   ii. from from 10.5 to 14.5% by weight of the total weight of the dry extract, of the ellagic acid.

3. The extract, according to claim 1, which further comprises from 1% to 5% by weight of the total weight of the dry extract, of punicalins.

4. The extract, according to claim 1, wherein the weight ratio of the ellagic acid to the punicalagins ranges from 0.6 to 1.6.

5. The extract according to claim 1, wherein the extract is an ethanolic extract or a dry extract.

6. A preparation comprising the extract as defined in claim 1 and at least one water-miscible organic solvent.

7. The preparation according to the preceding claim 6, wherein the at least one water-miscible organic solvent is chosen from glycerin, ethanol, butylene glycol, dipropylene glycol, ethoxydiglycol, and their mixtures.

8. The preparation according to claim 6, wherein the weight ratio of the solvent to the dry extract ranges from 95:5 to 99.9999:0.0001.

9. The preparation according to claim 6, wherein the extract represents from 0.0001% to 5% by weight in dry extract of the total weight of the preparation and the at least one solvent represents from 95% to 99.9999% by weight of the total weight of the preparation.

10. A composition comprising in a physiologically acceptable medium the extract according to claim 1 and optionally at least one water-miscible organic solvent.

11. The composition, according to claim 10, wherein the composition further comprises at least one ingredient selected from silicone fats; non-silicone fatty substances; fatty acids having 8 to 32 carbon atoms; esters and synthetic ethers; linear or branched hydrocarbons of mineral or synthetic origin; fatty alcohols having from 8 to 26 carbon atoms; water; C2-C6 alcohols; glycols; thickeners, emulsifiers, surfactants, gelling agents, cosmetic active ingredients, perfumes, fillers, dyestuffs, moisturizers, vitamins and polymers.

12. The composition according to claim 10, wherein the extract represents from 0.0001% to 5% by weight in dry extract of the total weight of the composition.

13. The composition according to claim 10, wherein the preparation represents from 0.1% to 60% by weight of the total weight of the composition.

14. A method of preparation of the *Punica granatum* extract according to claim 1 comprising at least the following steps:

i. providing a *Punica granatum* pericarp;
    ii. extracting from the said pericarp, at least punicalagins and ellagic acid, with ethanol of at least 99.5% degree at a temperature ranging from 37° C. to 45° C. during 2 to 5 hours;
    iii. filtering and repeating the step ii. at least two more times; and
    iv. optionally drying the filtrate obtained at the end of the step iii. at a temperature ranging from 35° C. to 40° C. under vacuum.

15. The extract according to claim 2, which further comprises from 1% to 5% by weight of the total weight of the dry extract, of punicalins.

16. The extract according to claim 2, wherein the weight ratio of the ellagic acid to the punicalagins ranges from 0.6 to 1.6.

17. The extract according to claim 1, wherein the weight ratio of the ellagic acid to the punicalagins ranges from 0.7 to 1.3.

* * * * *